United States Patent
Sakima et al.

(10) Patent No.: US 9,290,178 B2
(45) Date of Patent: Mar. 22, 2016

(54) DRIVING SUPPORT SYSTEM

(71) Applicant: DENSO CORPORATION, Kariya, Aichi-pref (JP)

(72) Inventors: Taku Sakima, Chiryu (JP); Akira Isogai, Kuwana (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 23 days.

(21) Appl. No.: 14/228,442

(22) Filed: Mar. 28, 2014

(65) Prior Publication Data

US 2014/0292502 A1    Oct. 2, 2014

(30) Foreign Application Priority Data

Mar. 29, 2013   (JP) .................................. 2013-072800

(51) Int. Cl.
- *B60Q 1/00* (2006.01)
- *B60W 30/09* (2012.01)
- *G08G 1/16* (2006.01)

(52) U.S. Cl.
CPC ............... *B60W 30/09* (2013.01); *G08G 1/165* (2013.01); *G08G 1/166* (2013.01)

(58) Field of Classification Search
CPC ........ G08G 1/165; G08G 1/166; B60W 30/09
USPC ..................... 340/435, 438; 701/29, 200, 301
See application file for complete search history.

(56) References Cited

U.S. PATENT DOCUMENTS

| | | | | |
|---|---|---|---|---|
| 2004/0178945 | A1* | 9/2004 | Buchanan | 342/70 |
| 2005/0228580 | A1 | 10/2005 | Winner et al. | |
| 2008/0074246 | A1* | 3/2008 | Isaji et al. | 340/435 |
| 2011/0196568 | A1* | 8/2011 | Nickolaou et al. | 701/29 |
| 2012/0176267 | A1* | 7/2012 | Nanami | 342/107 |

FOREIGN PATENT DOCUMENTS

| | | |
|---|---|---|
| JP | 2004-239792 A | 8/2004 |
| JP | 2005-524166 | 8/2005 |
| JP | 2007-008281 | 1/2007 |
| JP | 2007-128232 A | 5/2007 |

OTHER PUBLICATIONS

Office Action dated Aug. 4, 2015 in corresponding JP Application No. 2013-072800 with English translation.

\* cited by examiner

*Primary Examiner* — Tai T Nguyen
(74) *Attorney, Agent, or Firm* — Harness, Dickey & Pierce, P.L.C.

(57) ABSTRACT

A driving support system detects a target area ahead of the vehicle, a position or a moving direction, etc. of an object such as a pedestrian or another vehicle by using a camera or radar, as well as determines a probability of collision between the own vehicle and the object based on the position, etc. of the object, and performs a driving support for avoiding the collision when the probability of the collision is high. Further, a sensitivity of determination is set high when the object remains in the target area, or when the object is moving towards the target area, while the sensitivity is set low when the object is not present in the target area, or the object is moving away from the target area.

5 Claims, 3 Drawing Sheets

DRIVING SUPPORT SYSTEM

CROSS-REFERENCE TO RELATED APPLICATION

This application is based on and claims the benefit of priority from earlier Japanese Patent Application No. 2013-72800 filed Mar. 29, 2013, the description of which is incorporated herein by reference.

TECHNICAL FIELD

The present disclosure relates to a driving support system for avoiding collisions with pedestrians and other vehicles.

BACKGROUND

Conventionally, a driving support system that detects objects such as pedestrians and other vehicles around an own vehicle using a camera or radar, and provides driving support such as warning about a collision with objects, intervening in a driving operation in order to avoid the collision, etc. are known.

As an example of such a device, a driving support system disclosed in Japanese Patent Application Laid-Open Publication No. 2007-8281 detects white lines of a road ahead of an own vehicle by a camera, and detects stationary objects on a lane on which the own vehicle is traveling by radar.

Then, when the stationary objects are detected, a driving support for avoiding a collision with stationary objects is provided by setting a virtual white line so as to avoid the stationary objects and performing a lane maintenance control or a lane departure warning using the virtual white line.

In the driving support system described above, the driving support starts when the positional relationship or the like between the own vehicle and the object meets certain conditions.

However, there is a case where the objects by the road or off the road such as guardrails, etc. are positioned ahead of the own vehicle in a curve entrance and exit, for example, and in such a case, it may be determined incorrectly that a probability of the vehicle that will collide with the objects is high, and there is a possibility that the driving support activates needlessly.

In order to avoid such a needless activation, a threshold at a start condition of the driving support has been adjusted so that the driving support is less likely to be started in the driving support system described above.

However, there is sometimes a problem that the start condition is difficult to satisfy even in a case where other vehicles or pedestrians are present on the lane on which the own vehicle is traveling, thus the start of the driving support will be delayed.

SUMMARY

An embodiment provides a driving support system that can begin at a more appropriate timing while preventing a needless activation of the driving support system.

In a driving support system according to a first aspect, the driving support system includes an object detecting unit for detecting a position of an object existing around an own vehicle, a determining unit for determining whether or not a probability that the own vehicle will collide with one or more objects is equal to or more than a certain level based on the position of the object, a starting unit for starting a driving support for avoiding collision when an affirmative determination is made by the determining unit, an area detecting unit for detecting a target area on which the own vehicle is expected to travel, and an adjusting unit for adjusting a sensitivity of a determination of a collision probability based on a positional relationship between the object and the target area.

According to the above configuration, the determination sensitivity on the probability of collision with the object is set high when the probability of collision with the object is high as in a case such as when the object exists in front of the own vehicle, thereby it becomes easy to determine that the probability of collision is equal to or more than a certain level.

Thereby, the driving support can easily be started, and delay in starting the driving support can be prevented.

On the other hand, the determination sensitivity is set low when the probability of collision with the object is low as in the case such as when the object does not exist in front of the own vehicle, thereby it becomes difficult to determine that the collision probability is equal to or more than a certain level.

Thereby, the driving support becomes difficult to start and it is possible to prevent the needless activation of the driving support.

Accordingly, it is possible to prevent the needless activation of the driving support, while the driving support can be started at a more appropriate time.

In the driving support system according to a second aspect, the object detecting unit further detects a moving direction of the object, and the adjusting unit adjusts the sensitivity by further considering the moving direction of the object.

In the driving support system according to a third aspect, the adjusting unit determines whether an object existing outside the target area is moving towards the target area or not based on the positional relationship between the object and the target area and the moving direction of the object, and the sensitivity is enhanced when an affirmative determination is obtained.

In the driving support system according to a fourth aspect, the adjusting unit determines whether an object existing outside the target area is moving away from the target area or not based on the positional relationship between the object and the target area and the moving direction of the object, and the sensitivity is reduced when an affirmative determination is obtained.

DETAILED DESCRIPTION OF THE PREFERRED EMBODIMENTS

With reference to the accompanying drawings, hereinafter will be described embodiments of the present disclosure.

Note that embodiments of the present disclosure is not limited to embodiments described below, but may take various forms as long as they fall within a technical scope of the present disclosure.

[Explanation of Configuration]

A driving support system 10 of the present embodiment determines a probability that an own vehicle will collide with an object such as a pedestrian or another vehicle, and when the collision probability is equal to or more than a certain level, a driving support such as warnings or stopping of the own vehicle is provided.

Figure 1:
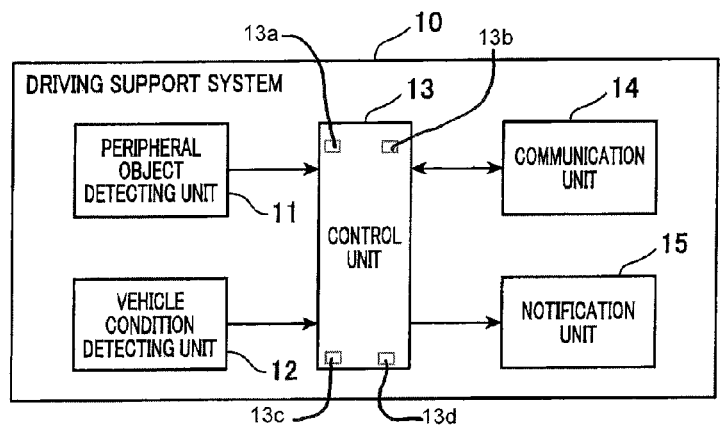
FIG. 1 shows a block diagram showing a configuration of a driving support system.

The driving support system 10 is composed of a peripheral object detecting unit 11, a vehicle condition detecting unit 12, a control unit 13, a communication unit 14, a notification unit 15, and the like (refer to FIG. 1).

The peripheral object detecting unit 11 is configured such as a camera for photographing a front of the own vehicle, or as a radar for transmitting radio waves of microwave or millimeter wave to the front of the own vehicle and receives echoes.

The peripheral object detecting unit 11 is a section that detects positions, sizes, shapes and the like of objects existing in front of or around the own vehicle.

The peripheral object detecting unit 11 may be configured by both the camera and radar, or may be configured by either one of them.

Further, the vehicle condition detecting unit 12 is composed of a yaw rate sensor, a steering angle sensor, a vehicle speed sensor, etc., and is a section that detects one or both of a yaw rate and/or a steering angle (hereinafter, described simply as the yaw rate or the like) and vehicle speed of the own vehicle.

A configuration for obtaining the yaw rate, the steering angle or the vehicle speed detected by another ECU (electronic control unit) through an in-vehicle LAN may be adopted.

The control unit 13 is composed of a CPU, ROM, RAM, I/O, etc., and is a section for overall control of the driving support system 10.

The communication unit 14 is a section that communicates with the other ECU through the in-vehicle LAN.

Further, the notification unit 15 is configured as a speaker or a displaying device, and is a section for performing various warnings for the driving support.

[Explanation of Operations]
(1) Outline

First, an outline of operation of the driving support system 10 of the present embodiment is explained.

The driving support system 10 detects via the peripheral object detecting unit 11 positions, sizes, shapes and the like of objects such as pedestrians, other vehicles, debris, etc. existing in and around the road ahead of the own vehicle (target road, i.e., a road on which the own vehicle is expected to travel) where the own vehicle is predicted to be travelling.

Further, the driving support system 10 may calculate a moving speed or a moving direction of the object based on history information such as the positions of the object.

Furthermore, the driving support system 10 periodically measures the yaw rate or the like and the vehicle speed by the vehicle condition detecting unit 12, and predicts a course of the own vehicle based on a result thereof.

Then, the driving support system 10 determines for a collision probability between the own vehicle and the objects based on the predicted course and the positions of the objects, and begins the driving support when a collision probability is equal to or more than a certain level.

Here, there is a case where the yaw rate and the like greatly vary instantaneously due to a vibration of a steering wheel or noise when predicting the course based on the yaw rate and the like, and an accuracy of a course prediction decreases if such variations are reflected directly in the prediction of the course.

Therefore, in the driving support system 10, low-pass filtering is applied for each measurement of the yaw rate or the like, and thereby an influence of sudden changes in the yaw rate or the like is suppressed, thus it becomes possible to predict the course accurately even when the vibration of the steering wheel, etc., occurs.

However, by applying low-pass filtering, time lag occurs until a change in yaw rate or the like caused by a steering operation to be reflected in the course prediction.

Thus, for example, when running on a curve, since it is not possible to predict the course accurately under a situation where the curvature of the road changes suddenly like the entrance of the curve, a situation where the exact route prediction becomes possible after passing through the entrance and steering becomes stable occurs.

Thus, by applying the low-pass filtering process, it becomes impossible to predict the exact route under certain circumstances, and as a result, the collision probability with the object based on the predicted course cannot be accurately determined, thus the driving support can easily activates needlessly.

Therefore, conventionally, in order to prevent needless activation of the driving support when performing the driving support based on the collision probability of such a threshold when determining the collision probability, another threshold regarding the start condition of the driving support based on the collision probability and the like has a tendency to be set in which the driving support is less likely to be started (in other words, conventionally, the sensitivity of the determination (determination sensitivity) on the collision probability has been set low).

In addition, by considering a case where a relative velocity between the own vehicle and the object is high, it is desired that a sensitivity of detecting the object is enhanced and the start condition is make easy to be satisfied (in other words, it is desired that the determination sensitivity is increased).

Thereby, detecting an object existing in the distance or early detection of the object becomes possible so that the driving support can be started early before the object having the high relative velocity approaches the own vehicle, and the collisions can be avoid more reliably.

However, false detections of the object are easily generated when the detection sensitivity of the object is enhanced, and as a result, needless activation of the driving support easily occurs, thus it is impossible to enhance the detection sensitivity.

Therefore, conventionally, there was a problem that the starting timing of the driving support for avoiding the collision with the object would become slow because it was impossible to increase the determination sensitivity high enough to prevent the needless activation of the driving support.

Then, in the driving support system 10 of the present embodiment, when detecting the object in front and around of the own vehicle through the peripheral object detection unit 11, and if such an object does not exist in front of the own vehicle, for example, the determination sensitivity of the collision probability between the own vehicle and the object is set to low and the driving support is less likely to be started.

Figure 2:
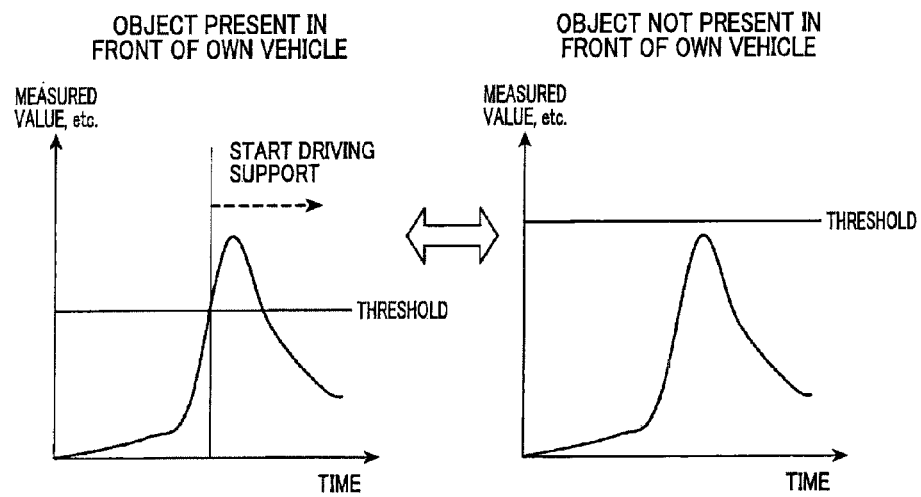
FIG. 2 shows an explanatory diagram for adjusting a sensitivity regarding a determination (determination sensitivity) of a collision probability between an own vehicle and an object.

On the other hand, if such an object is present in front of the own vehicle, the driving support system 10 sets the determination sensitivity to high, and the driving support becomes easy to start (refer to FIG. 2).

The following describes in detail a process of adjusting the determination sensitivity, and a process at the start of the driving support.

(2) Driving Support Starting Process

Figure 3:
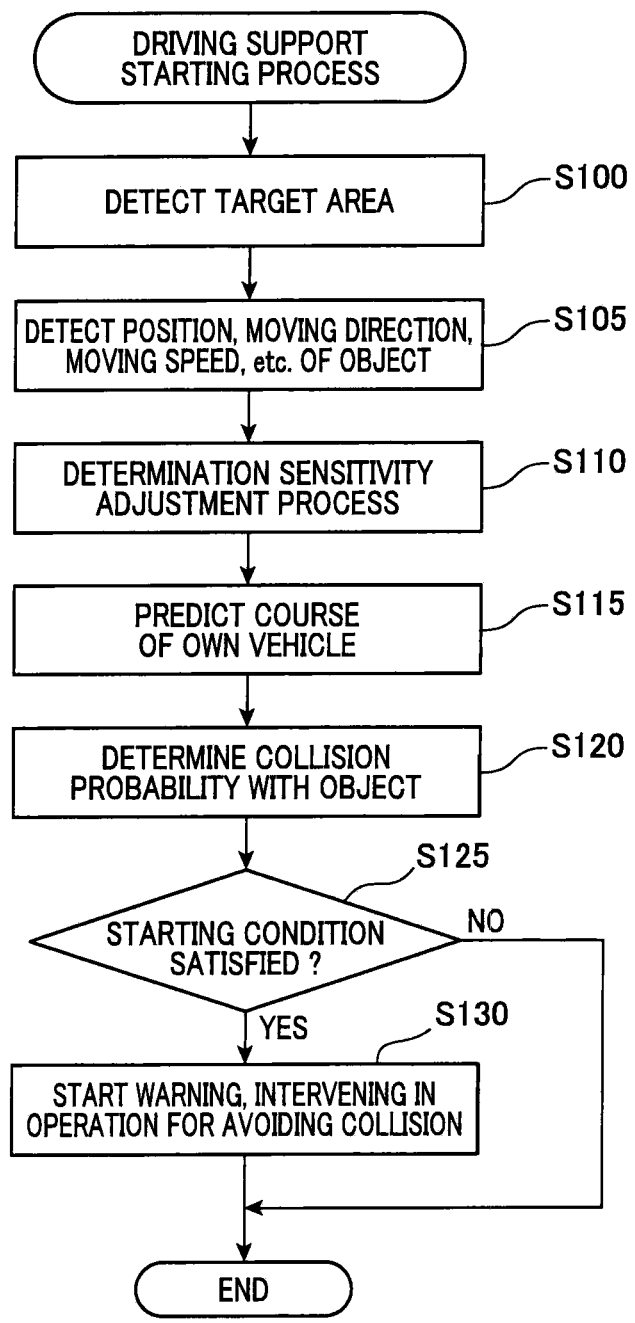
FIG. 3 shows a flow chart for driving support starting process.

First, the driving support starting process for starting the driving support according to the collision probability with the object will be described with reference to a flowchart disclosed in FIG. 3.

The present process is executed at periodic timing by the control unit 13 of the driving support system 10.

In step S100, the control unit 13 defines the target road as a road having a predetermined length extending forward starting from the own vehicle, and the control unit 13 includes an area detecting unit 13a that detects a target area, which is a traveling area of the vehicle in the target road, using the peripheral object detection unit 11.

The control unit 13 also detects an area that is adjacent to either side of the target area and extending along the target area as a peripheral area, and the process proceeds to step S105.

Specifically, when the peripheral object detecting unit 11 is configured as a camera, the control unit 13 may perform white line recognition or the like, for example, using an image captured by the camera, and may detect the target area based on a recognition result.

Further, when the peripheral object detecting unit 11 is configured to use radar, the control unit 13 may detect the target area based on a shape or position of the object detected by radar.

Further, the control unit 13 may define an area of a lane where the own vehicle is traveling (own lane) as a target area, or may detect all of the lanes where the own vehicle travels as the target road when the target road is provided with a plurality of lanes on one side of the road, for example.

Furthermore, the control unit 13 may detect an area of a sidewalk as the peripheral area when the sidewalk is provided along the target road, or may detect an area on an opposite lane as the peripheral area, for example.

In step S105, the control unit 13 detects the front of the own vehicle or the position, the size, the shape, or the like of the object by the peripheral object detecting unit 11, and the detected result is stored in the RAM.

Then, the control unit 13 estimates a moving direction and speed of the object based on the history of the detected position of the object, and the estimation result is stored in the RAM, then the process proceeds to step S110.

In step S110, the control unit 13 includes an adjusting unit 13b that performs a determination sensitivity adjusting process that adjusts the sensitivity of determination based on the moving direction or position of the object, then the process proceeds to step S115.

In step S115, the control unit 13 measure the yaw rate and the own vehicle speed, etc. in the vehicle condition detecting unit 12, and performs low-pass filtering process on the measured result of the yaw rate and the like.

Then, the control unit 13 predicts the course of the own vehicle based on the measured result from the yaw rate and the speed measurements, where the low-pass filtering is applied, and the process proceeds to step S120.

In step S120, the control unit 13 includes a determining unit 13c that determines the collision probability with the object based on the predicted course of the own vehicle, the position, the size, and the like of the object, then in a subsequent step S125, it is determined whether the collision probability with the object is equal to or more than a certain level so that the starting condition of the driving support is satisfied.

Specifically, the control unit 13 estimates a predicted collision position or a predicted collision timing between the own vehicle and the object based on, for example, a predicted course of the own vehicle, the own vehicle speed, a position of the object, its size, its moving direction, or its moving speed, etc., and may calculate a remaining distance to the predicted collision position or a remaining time to the predicted collision timing.

Then, the control unit 13 includes a starting unit 13d that may determine that the start condition of the driving support is satisfied when the calculated value is equal to or less than the threshold value.

Further, the control unit 13 may also estimate a lateral distance between the own vehicle and the object at the predicted collision position based on the width of the own vehicle or a position of the side of the object (lateral position) etc., for example.

Then, the control unit 13 may also determine that the probability of collision is equal to or more than a certain level and the start condition of the driving support is satisfied when the estimated value is equal to or less than the threshold value.

Then, the control unit 13 continues the process to step S130 when the start condition is satisfied (S125: Yes), while the process is finished when the start condition is not satisfied (S125: No).

In step S130, the control unit 13 performs the process for the driving support, and then finishes the process.

Specifically, for example, the control unit 13 may emit a warning sound or display a warning message that indicates the collision probability is high through the notification unit 15.

Of course, the control unit 13 may communicate with another ECU via the communication unit 14 and output the warning sound or the warning message by the ECU.

Further, the control unit 13 may communicate with the other ECU via the communication unit 14 and actuate brakes to stop the own vehicle, or may perform a steering assist in order to alter the course of the own vehicle so as to avoid collision with the object.

(3) Determination Sensitivity Adjustment Process

Figure 4:
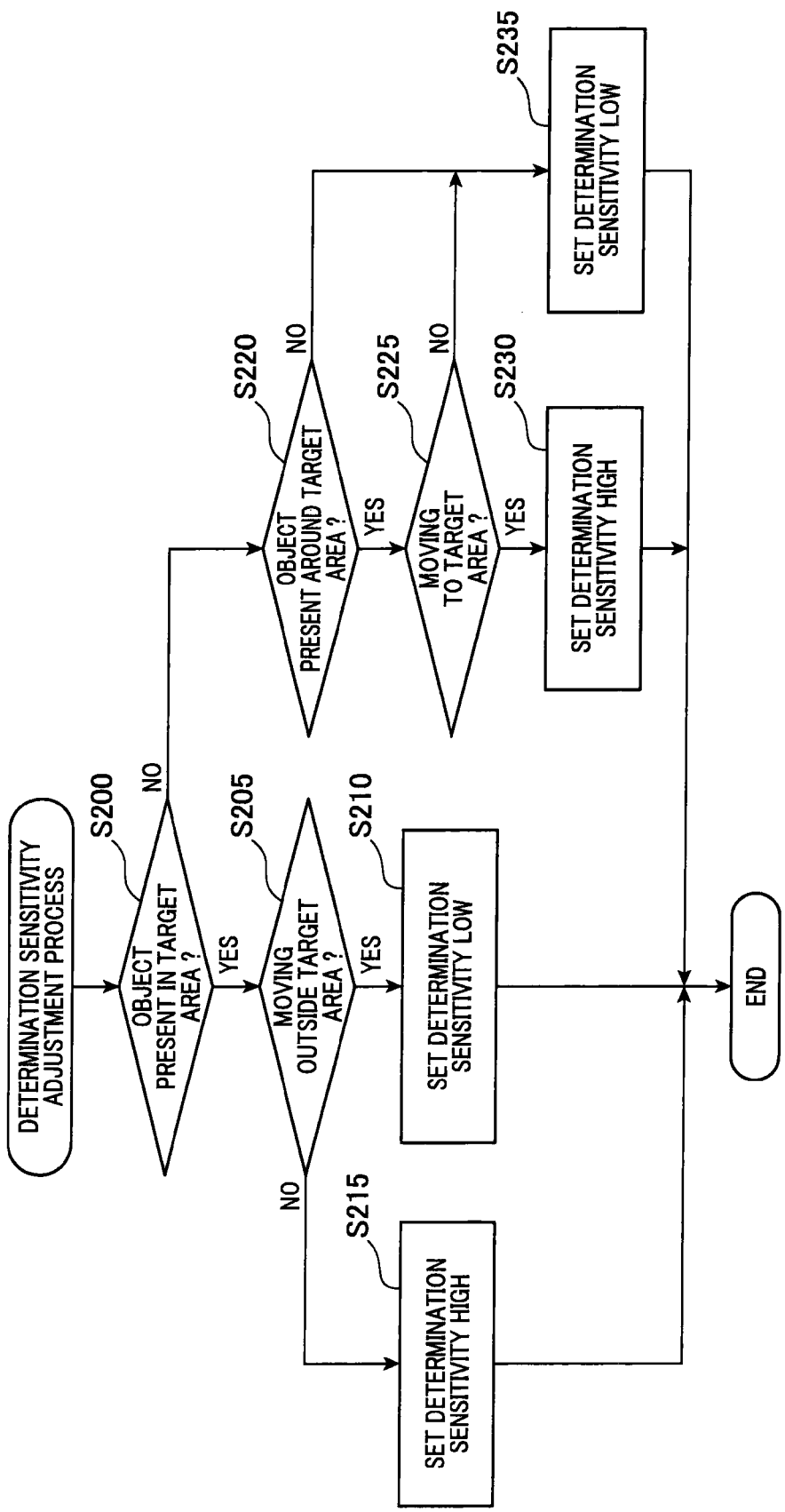
FIG. 4 shows a flowchart for determination sensitivity adjusting process.

Next, the determination sensitivity adjustment process for adjusting the determination sensitivity is described with reference to the flow chart disclosed in FIG. 4.

The present process is configured as a sub-routine called from the driving support starting process.

In step S200, the control unit 13 determines the presence of the object existing in the target area based on the position of the previously detected object.

Then, the control unit 13 allows the process to proceed to step S205 when the object is present (S200: Yes), or allows the process to proceed to step S220 when the object is not present (S200: No).

In step S205, the control unit 13 determines whether the object is moving toward outside the target area with a speed equal to or more than a predetermined speed or not based on the position, the moving direction, the moving speed, etc., of the object for each object existing in the target area.

Then, the control unit 13 the process proceeds to step S210 when all objects existing in the target area are moving toward outside the target area with a speed equal to or more than a predetermined speed (S205: Yes), or proceeds the process to step S215 otherwise (S205: No).

In addition, the control unit 13 may determine whether the objects are located around edges of the target area and are moving toward outside the target area or not for each object existing in the target area based on the position, the moving direction, etc. of the object.

Then, the control unit 13 may proceed the process to step S210 when all objects that are present in the target area are located around the edges and are moving away from the target area (S205: Yes), (S205 No), or proceeds the process to step S215 otherwise (S205: No).

In step S210, the control unit 13 sets the determination sensitivity to low, then finishes the process.

On the other hand, in step S215, the control unit 13 sets the determination sensitivity to high, and then finishes the process.

In step S220 where the process proceeds when the objects are not present in the target area, the control unit 13 determines whether the objects are present in the peripheral area adjacent to either side of the target area or not.

Then, the control unit 13 the process proceeds to step S225 when the objects are present (S220: Yes), or proceeds the process to step S235 when the objects are not present (S220: No).

In step S225, the control unit 13 determines whether the objects are moving toward the target area with a speed equal to or more than a predetermined speed or not for each object existing in the peripheral area based on the position, the moving direction, the moving speed, etc. of the object.

Then, the control unit 13 the process proceeds to step S230 when at least one object present in the peripheral area is moving toward the target area with the speed equal to or more than a predetermined speed (S225: Yes), or proceeds the process to step S235 otherwise.

In addition, the control unit 13 may determine whether each object present in the peripheral area is moving toward the target area based on the direction of movement without considering the moving speed of the object.

Then, the control unit 13 may proceed the process to step S230 when at least one object present in the peripheral area is moving toward the target area (S225: Yes), while the process proceeds to step S235 otherwise.

In step S230, the control unit 13 sets the determination sensitivity to high, then finishes the process.

On the other hand, in step S235, the control unit 13 sets the determination sensitivity to low, and then finishes the process.

(4) Adjustment of Determination Sensitivity

Next, a specific example of an adjustment of the determination sensitivity is explained.

As mentioned above, the starting condition of the driving support is configured to be that the remaining distance to the predicted collision position or the remaining time to the predicted collision timing becomes equal to or less than the threshold value, or the estimated value of the lateral distance between the own vehicle and the object at the predicted collision position becomes equal to or less than the threshold value in the driving support system 10, as the example.

When in such a case, the driving support becomes easy to start if the threshold value is set large and the determination sensitivity is high, while the driving support becomes difficult to start if the threshold value is set small and the determination sensitivity is low.

Further, for example, when the peripheral object detecting unit 11 is configured to use radar, a radio wave is irradiated periodically in the driving support system 10, while the position of the object is measured by an echo, and measured results are stored.

Further, the position of the object or the like is continuously measured by irradiation of the radio waves in each period, and when the object is in the same position, or when the position of the object is moving in a certain direction, an existence probability of the object is calculated based on the number of times the position of the object is measured.

The existence probability increases as the number of times the positions of the object is measured increases, and when the existence probability is equal to or more than the threshold, it is recognized as the object is in existence.

Therefore, if the threshold of the existence probability is reduced, the object becomes easily detected by the peripheral object detecting unit 11, and since the detection sensitivity of the object is enhanced, the determination sensitivity becomes high.

On the other hand, if the threshold of the existence probability is increased, the object becomes difficult to be detected by the peripheral object detecting unit 11, and since the detection sensitivity of the object is decreased, the determination sensitivity becomes low.

Further, since the collision probability of the object that exists in a lane on which the own vehicle is traveling (own traveling lane) is high, it is considered that the start condition is set so as to start the driving support earlier when such object is detected.

Then, when the peripheral object detecting unit 11 is configured to use radar, whether the object is in the own traveling lane is determined based on the position of the object measured by irradiation of the radio waves in each period.

That is, an own lane existence probability that is a probability that the object exists in the own traveling lane is calculated based on a measured result of the positions of each period, and when the own lane existence probability is equal to or more than a threshold, the object is recognized as being in existence in the own traveling lane.

Therefore, if the threshold of the own lane existence probability is reduced, the object is easy to determine as being in the own traveling lane, and as a result, since the driving support is started early, the determination sensitivity becomes high.

On the other hand, if the threshold of the own lane existence probability is increased, the object becomes difficult to be determined as being in the own traveling lane, and as a result, since the driving support is started late compared with a situation where the object exists in the own traveling lane, the determination sensitivity becomes low.

[Effect]

According to the driving support system 10 of the present embodiment, the determination sensitivity is set high when the probability of collision with the object is high as in the case such as when the object remains in the target area, or when an object outside the target area is moving towards the target area.

Thereby, since it becomes easy to determine that the probability of collision is equal to or more than a certain level, the driving support can easily be started, and delay in starting the driving support can be prevented.

On the other hand, the determination sensitivity is set low when the probability of collision with the object is low as in the case such as when the object is not present in the target area, or the object existing in the target area is moving away from the target area.

Thereby, since the collision probability is determined to be low and it becomes difficult to determine that the collision probability is equal to or more than a certain level, it becomes difficult to start the driving support and this can prevent the driving support from activating needlessly.

Accordingly, it is possible to prevent the needless activation of the driving support, while the driving support can be started at a more appropriate time.

Other Embodiments (1) In the determination sensitivity adjusting process of the present embodiment, although the control unit 13 adjusts the determination sensitivity based on the moving speed or the moving direction of the object, it is not limited to this and the determination sensitivity may be adjusted based only on the position of the object.

Specifically, the control unit 13 may set the determination sensitivity high when the object is present in the target area or in the peripheral area, and when the object is not present, the determination sensitivity may be set low, for example.

It is possible to obtain the same effect even in such a case.

(2) Although the control unit 13 determines the collision probability based on the predicted course of the own vehicle in the driving support starting process of the present embodiment, the collision probability may be determining without considering the predicted course.

Specifically, for example, the control unit 13 may determine the collision probability based on whether the distance between the own vehicle and the object becomes less than a certain threshold, whether an object is approaching the own vehicle at a speed greater than or equal to the predetermined threshold, or the like.

Note that when determining the probability of collision in this manner, the determination sensitivity is adjusted by changing the threshold values.

It is possible to obtain the same effect even in such a case.

(3) The driving support starting process of the present embodiment may be configured to provide a plurality of types of driving supports and perform different types of driving support depending on how high the collision probability is.

Specifically, two types of driving supports may be provided for warnings and operation interventions, respectively.

The starting condition may be set so that the driving support starts performing the warnings when the collision probability is relatively low, and the starting condition may be set so that the driving support starts performing the operation interventions when the collision probability is relatively high.

Further, when performing the driving support in such a way, in the determination sensitivity adjustment process, the determination sensitivity may be adjusted by adjusting the threshold regarding the starting condition of each driving support, or the determination sensitivity may be adjusted by adjusting the threshold regarding the starting condition of any one of the driving supports.

It is possible to obtain the same effect even in such a case.

[Correspondence Between the Claims]

Correspondences between terms used in the description of the above embodiments and terms used in the claims are shown hereafter.

Step S100 of the driving support starting process in the present embodiment corresponds to an area detecting unit, step S105 corresponds to an object detecting unit, steps S120 and S125 correspond to a determining unit, and step S130 corresponds to a starting unit.

In addition, steps S200 to S235 of the determination sensitivity adjusting process correspond to an adjusting unit.

What is claimed is:

1. A driving support system comprising:
an object detecting unit for detecting a position of an object existing around an own vehicle;
a determining unit for determining whether or not a probability that the own vehicle will collide with one or more objects is equal to or more than a certain level based on the position of the object;
a starting unit for starting a driving support for avoiding collision when an affirmative determination is made by the determining unit;
an area detecting unit for detecting a target area on which the own vehicle is expected to travel; and
an adjusting unit for adjusting a sensitivity of a determination of a collision probability based on a positional relationship between the object and the target area wherein
the object detecting unit further detects a moving direction of the object;
the adjusting unit adjusts the sensitivity by further considering the moving direction of the object;
the adjusting unit determines whether an object existing outside the target area is moving towards the target area or not based on the positional relationship between the object and the target area and the moving direction of the object;
the sensitivity is enhanced when an affirmative determination is obtained.

2. The driving support system according to claim 1, wherein,
the adjusting unit determines whether an object existing outside the target area is moving away from the target area or not based on the positional relationship between the object and the target area and the moving direction of the object; and
the sensitivity is reduced when an affirmative determination is obtained.

3. The driving support system according to claim 1, wherein,
the adjusting unit determines whether an object existing outside the target area is moving away from the target area or not based on the positional relationship between the object and the target area and the moving direction of the object; and
the sensitivity is reduced when an affirmative determination is obtained.

4. A driving support system comprising:
an object detecting unit for detecting a position of an object existing around an own vehicle;
a determining unit for determining whether or not a probability that the own vehicle will collide with one or more objects is equal to or more than a certain level based on the position of the object;
a starting unit for starting a driving support for avoiding collision when an affirmative determination is made by the determining unit;
an area detecting unit for detecting a target area on which the own vehicle is expected to travel; and
an adjusting unit for adjusting a sensitivity of a determination of a collision probability based on a positional relationship between the object and the target area; wherein
the adjusting unit determines whether an object existing outside the target area is moving towards the target area or not based on the positional relationship between the object and the target area and the moving direction of the object; and
the sensitivity is enhanced when an affirmative determination is obtained
the adjusting unit determines whether an object existing outside the target area is moving away from the target area or not based on the positional relationship between the object and the target area and the moving direction of the object; and
the sensitivity is reduced when an affirmative determination is obtained.

5. A driving support system comprising:
an object detecting unit for detecting a position of an object existing around an own vehicle;

a determining unit for determining whether or not a probability that the own vehicle will collide with one or more objects is equal to or more than a certain level based on the position of the object;

a starting unit for starting a driving support for avoiding collision when an affirmative determination is made by the determining unit;

an area detecting unit for detecting a target area on which the own vehicle is expected to travel; and an adjusting unit for adjusting a sensitivity of a determination of a collision probability based on a positional relationship between the object and the target area;

wherein, the target area is defined as an area of an own lane where the own vehicle is traveling;

the determining unit further determines that the object exists in the own lane when an existence probability of the object within the own lane reaches a predetermined threshold;

the determining unit further determines that the collision probability reaches the certain level when the object exists in the own lane earlier compared with a case where the object does not exist in the own lane;

the sensitivity is defined as the threshold; and the adjusting unit enhances the sensitivity by setting the threshold small and reduces the sensitivity by setting the threshold large.

* * * * *